(12) United States Patent
Zhou et al.

(10) Patent No.: US 9,246,543 B2
(45) Date of Patent: Jan. 26, 2016

(54) SMART AUDIO AND VIDEO CAPTURE SYSTEMS FOR DATA PROCESSING SYSTEMS

(75) Inventors: Jiong Zhou, Santa CLara, CA (US); Ton Kalker, Mountain View, CA (US)

(73) Assignee: Futurewei Technologies, Inc., Plano, TX (US)

( * ) Notice: Subject to any disclaimer, the term of this patent is extended or adjusted under 35 U.S.C. 154(b) by 403 days.

(21) Appl. No.: 13/323,157

(22) Filed: Dec. 12, 2011

(65) Prior Publication Data

US 2013/0147923 A1    Jun. 13, 2013

(51) Int. Cl.
| | | |
|---|---|---|
| H04N 13/02 | (2006.01) | |
| H04B 3/20 | (2006.01) | |
| H04N 7/15 | (2006.01) | |
| H04R 3/00 | (2006.01) | |
| H04N 7/14 | (2006.01) | |

(52) U.S. Cl.
CPC .. *H04B 3/20* (2013.01); *H04N 7/15* (2013.01); *H04N 13/02* (2013.01); *H04N 13/0239* (2013.01); *H04N 13/0296* (2013.01); *H04R 3/005* (2013.01); *H04N 2007/145* (2013.01); *H04R 2499/11* (2013.01)

(58) Field of Classification Search
CPC ... H04R 25/407; H04S 7/301; G10L 21/0208; G10L 21/028
USPC .......................................... 348/46, 47; 381/66
See application file for complete search history.

(56) References Cited

U.S. PATENT DOCUMENTS

| | | | |
|---|---|---|---|
| 7,015,954 B1 * | 3/2006 | Foote et al. ................ | 348/218.1 |
| 7,817,805 B1 | 10/2010 | Griffin | |
| 2005/0069149 A1 | 3/2005 | Takahashi et al. | |
| 2007/0098191 A1 | 5/2007 | Wan et al. | |
| 2007/0237339 A1 * | 10/2007 | Konchitsky ................. | 381/91 |
| 2010/0066665 A1 | 3/2010 | Yoneda et al. | |
| 2010/0081487 A1 | 4/2010 | Chen et al. | |

(Continued)

FOREIGN PATENT DOCUMENTS

| | | |
|---|---|---|
| EP | 2163966 A2 | 3/2010 |
| EP | 2237272 A2 | 6/2010 |

OTHER PUBLICATIONS

"G-Slate," LG G-Slate with Google V909 Tablets—LG Electronics US, http://www.lg.com/us/mobile-phones/tablets/LG-V909.jsp, downloaded Sep. 30, 2011, 1 page.

(Continued)

*Primary Examiner* — Thai Tran
*Assistant Examiner* — Jose Mesa
(74) *Attorney, Agent, or Firm* — Conley Rose, P.C.; Grant Rodolph; Brandt D. Howell (57) ABSTRACT

A computation system comprising an orientation detection device configured to detect position information comprising a position and an orientation of the computation system, a multi-sensor system coupled to the orientation detection device, wherein the multi-sensor system is configured to capture environmental input data, wherein the multi-sensor system comprises at least one of an audio capturing system and a three-dimensional (3D) image capturing system, and wherein the environmental input data comprises at least one of audio and an image, and at least one signal processing component coupled to the orientation detection device and to the multi-sensor system, wherein the processor is configured to modify the captured environmental input data based on the position information.

19 Claims, 10 Drawing Sheets

(56) References Cited

U.S. PATENT DOCUMENTS

| | | | |
|---|---|---|---|
| 2011/0090303 A1* | 4/2011 | Wu et al. | 348/14.16 |
| 2011/0158425 A1 | 6/2011 | Hayakawa | |
| 2012/0026290 A1* | 2/2012 | Lim et al. | 348/46 |
| 2012/0062729 A1* | 3/2012 | Hart et al. | 348/135 |
| 2012/0120218 A1* | 5/2012 | Flaks et al. | 348/77 |
| 2012/0128176 A1* | 5/2012 | Acero et al. | 381/92 |
| 2012/0295637 A1* | 11/2012 | Hannuksela et al. | 455/456.1 |

OTHER PUBLICATIONS

Schmidt, "Multiple Emitter Location and Signal Parameter Estimation," IEEE Transactions on Antennas and Propagation, vol. AP-34, No. 3, Mar. 1986, pp. 276-280.

Wang, et al., "Coherent Signal-Subspace Processing for the Detection and Estimation of Angles of Arrival of Multiple Wide-Band Sources," IEEE Transactions on Acoustics, Speech, and Signal Processing, Vo. ASSP-33, No. 4, Aug. 1985, pp. 823-831.

Foreign Communication From a Counterpart Application, PCT Application PCT/CN2012/086425, International Search Report dated Mar. 28, 2013, 7 pages.

Foreign Communication From a Counterpart Application, PCT Application PCT/CN2012/086425, Written Opinion dated Mar. 28, 2013, 4 pages.

Foreign Communication From a Counterpart Application, European Application No. 12856814.4, Partial Supplementary European Search Report dated Jan. 26, 2015, 6 pages.

\* cited by examiner

SMART AUDIO AND VIDEO CAPTURE SYSTEMS FOR DATA PROCESSING SYSTEMS

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Different manufacturers have provided different tablets into the consumers market, such as the products released since 2010. The tablets, also referred to as personal tablets, computer tablets, or pads, such as the iPad from Apple, are portable devices that offer several advantages in documentation, email, web surfing, social activities, and personal entertainment than other types of computing devices. Generally, a tablet has a sound recording system which enables the tablet to record sound, for example to enable voice communications or media applications. The digital data converted by a microphone in this recording system is used to perform various purposes, such as recognition, coding, and transmission. Since the sound environment includes noise. The recorded target sound in the microphone is enhanced or separated from noise in order to obtain clean sound. Some tablets may also have a three dimensional (3D) video camera feature, which can be used to implement 3D video conferencing with other tablet or device users.

SUMMARY

In one embodiment, the disclosure includes a computation system comprising an orientation detection device configured to detect position information comprising a position and an orientation of the computation system, a multi-sensor system coupled to the orientation detection device, wherein the multi-sensor system is configured to capture environmental input data, wherein the multi-sensor system comprises at least one of an audio capturing system and a three-dimensional (3D) image capturing system, and wherein the environmental input data comprises at least one of audio and an image, and at least one signal processing component coupled to the orientation detection device and to the multi-sensor system, wherein the processor is configured to modify the captured environmental input data based on the position information.

In another embodiment, the disclosure includes a sound recording system comprising a direction of arrival (DOA) estimation component coupled to one or more microphones and configured to estimate DOA for a detected sound signal using received orientation information, a noise reduction component coupled to the DOA estimation component and configured to reduce noise in the detected sound signal using the DOA estimation, and a de-reverberation component coupled to the noise reduction component and the DOA estimation component and configured to remove reverberation effects in the detected sound signal using the DOA estimation.

In another embodiment, the disclosure includes a three-dimensional (3D) video capturing system comprising a camera configuration device coupled to at least two cameras and configured to arrange at least some of the cameras to properly capture one of a 3D video and a 3D image based on detected orientation information for the 3D video capturing system, and an orientation detection device coupled to the camera configuration device and configured to detect the orientation information.

In another embodiment, the disclosure includes a sound recording method implemented on a portable device, comprising detecting an orientation of the portable device, adjusting a microphone array device based on the detected orientation, recording a sound signal using the adjusted microphone array device, and estimating a direction of arrival (DOA) for the sound signal based on the detected orientation.

In another embodiment, the disclosure includes a three-dimensional (3D) video capturing method implemented on a portable device, comprising detecting an orientation of the portable device, configuring a plurality of cameras based on the detected orientation, and capturing a video or image using the configured cameras.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Emerging and future tablets may include advanced microphone arrays that may be integrated into the tablets to provide better recorded sound quality, e.g., with higher signal to noise ratio (SNR). The advanced microphone array devices may be used instead of currently used omni-directional (uni-directional) microphones for detecting target sounds. The microphone array may be more adaptable to the direction of the incoming sound, and hence may have better noise cancellation property. One approach to implement the microphone array may be to emphasize a target sound by using a phase difference of sound signals received by the microphones in the array based on a direction of a sound source and a distance between the microphones, and hence suppress noise. Different algorithms may be used to achieve this.

For example, to enhance the received sound signal, a Coherent Signal Subspace process which may implement a Multiple Signal Classification (MUSIC) algorithm may be used. This algorithm may require pre-estimating the signal direction, where the estimation error in the signal direction may substantially affect the final estimation of the process. Estimating the sound signal's DOA with sufficient accuracy may be needed for some applications, such as for teleconferencing system, human computer interface, and hearing aid. Such applications may involve DOA estimation of a sound source in a closed room. Hence, the presence of a significant amount of reverberation from different directions may substantially degrade the performance of the DOA estimation algorithm. There may be a need to obtain a more reliable pre-estimated DOA that locates a speaker in a reverberant room. Further, an improved estimated DOA may improve noise cancellation since the noise source may have a different direction than the target sound.

Another important scenario that may need attention is estimating or identifying the user's face position with respect to a tablet's 3D video camera system. For example, when the user participates in a 3D video conferencing with another user using the tablet, the user may not hold the tablet in a designated proper position or the orientation of the tablet may be unknown to the 3D video camera system. Current 3D video camera enabled tablets in the market may not have the ability to capture a correct 3D video or image when the tablet is not held in the proper position. A position aware system and a camera configuration system which uses position or orientation information to adaptively configure the 3D cameras of the system to capture correct 3D video/images may be needed.

Disclosed herein are systems and methods for allowing improved sound recording and 3D video/image capturing using tablets. The systems may be configured to detect and obtain the tablet's orientation or position information and use this information to enhance the performance of a sound recording sub-system and/or a 3D video capture sub-system in the tablet. The terms position information and orientation information are used herein interchangeably to indicate the orientation and/or tilting (e.g., in degrees) of the tablet, for instance with respect to a designated position, such as a horizontal alignment of the tablet. The systems may comprises an orientation detection device, a microphone adjusting device, a camera configuration device, a sub-system of sound recording, a sub-system of 3D video capturing, or combinations thereof. The orientation detection device may be used to generate position/orientation of the tablet, which may be used by the microphone adjusting device and/or the camera configuration device. The microphone adjusting device may use this information to adjust the sensing angle in the microphone(s) and align the angle to the direction of the target sound. The position/orientation information may also be used to implement signal processing schemes in the sound recording sub-system. The video configuration device may use this information to re-arrange the cameras for capturing video/image. The information may also be used to implement corresponding processes in the 3D video capturing sub-system to obtain the correct 3D video or image.

Figure 1:
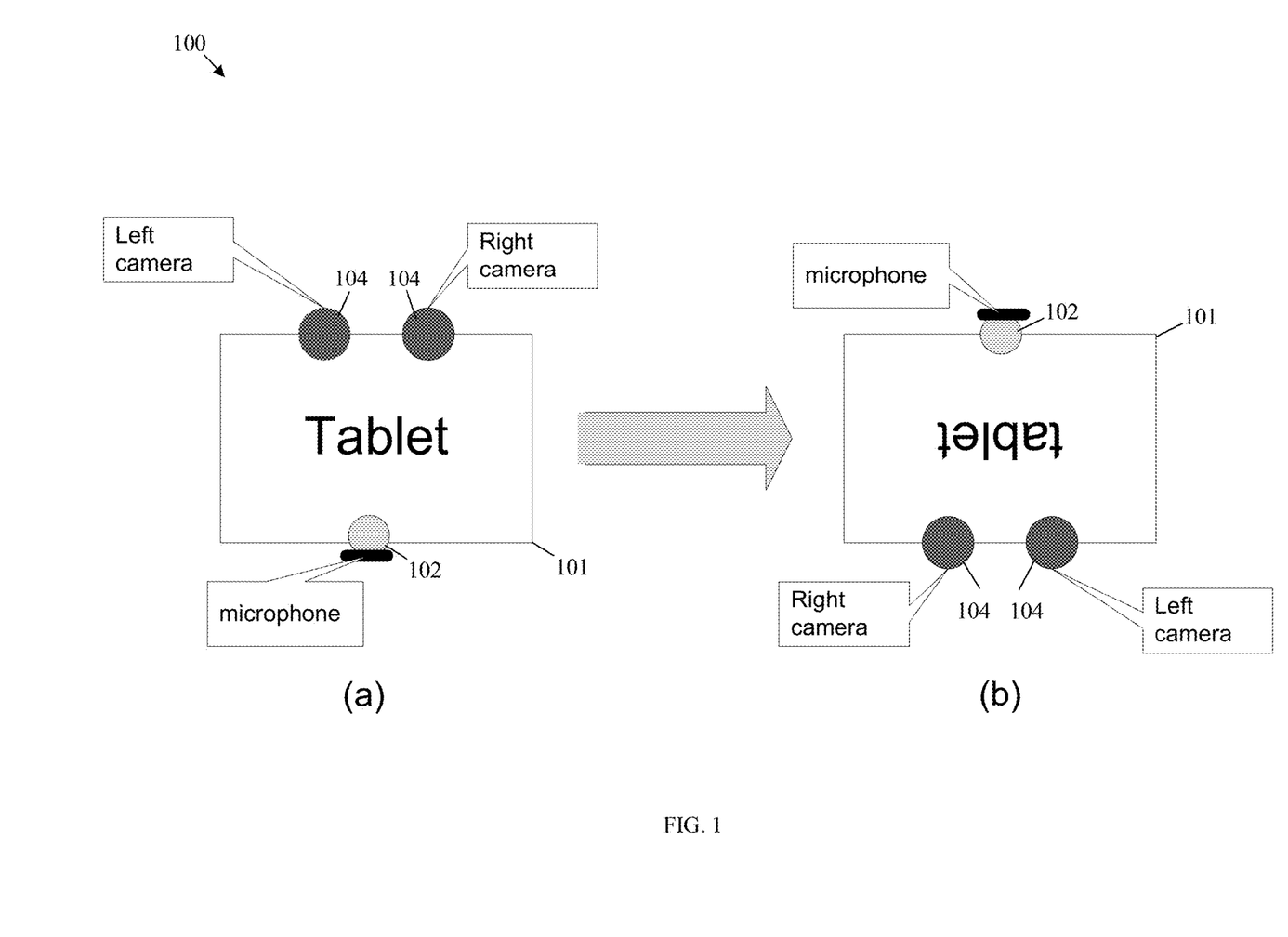
FIG. 1 is a schematic diagram of a tablet design.

FIG. 1 illustrates an embodiment of a tablet design 100 for a tablet 101. The tablet 101 may be any portable computation device characterized by a flat screen on one side of the tablet's housing. The display screen may be used for viewing and may also be a touch screen used for typing. The tablet 101 may not require connecting separate interface devices for basic operations, which may not be the case for a desktop computer. The tablet 101 may be a fixed device that is not foldable or that does not require mechanical operation, such as in the case of a laptop. The tablet 101 may offer fewer features/functions than other types of computation devices (e.g., laptops) and have lower pricing and cost. The tablet 101 may also have lighter weight and may be more portable friendly. The tablet 101 may be different than other communication devices, such as smartphones, in that the tablet 101 may be larger in size, offer more computation power and functions, and/or may not necessarily be equipped with a cellular interface. The table 101 may have similar features to at least some currently available tablets, also referred to as pads, in the market, such as the Apple iPad, the Hewlett-Packard (HP) Slate tablet, the Samsung Galaxy tablet, the Lenovo IdeaPad, the Dell Latitude tablet, and other tablets or pads.

The tablet design 100 may have a relatively small thickness with respect to its width or length and a flat display screen (e.g., touch screen) on one side of the tablet 101. The top and bottom edges of the table 101 may be wider than the remaining (side) edges of the tablet 101. As such, the length or the top and bottom edges may correspond to the length of the tablet 101 and the length of the side edges may correspond to the width of the tablet 101. The display screen may comprise a substantial area of the total surface of the tablet 101. The tablet design 100 may also comprise a microphone 102, e.g., on one edge of the tablet 101 around the screen, and typically one or two cameras 104, e.g., on another edge of the tablet 101, as shown in FIG. 1 (a). The microphone 102 may be an omni-directional microphone or a microphone array device that is part of an audio recording system of the tablet 101 for receiving user's voice, enabling voice communications, sound recording, communications, or combinations thereof. The cameras 104 may be part of a video capturing system of the tablet 101 for shooting images or video, enabling video conferencing or calling, or both. The cameras 104 may be 3D cameras and the video capturing system may be a 3D video capturing system that captures 3D images or video. A 3D camera is a single device that is capable of capturing both "RGB" information and 3D information. In some embodiments, at least two cameras 104 may be needed to capture two frames (at about the same time) for the same image from different perspectives. The two frames may then be processed according to a 3D processing scheme to render a 3D like image. The same concept may be applied for 3D video capturing.

Typically, the audio recording system may be optimized according to one designated orientation of the tablet 101. For instance, the audio recording system may be optimized for an upright position of the tablet 101, as shown in FIG. 1 (a). In this position, the microphone 102 may be positioned at the bottom edge of the tablet 101 (e.g., around the center of the bottom edge). As such, the target sound or user's voice detected by the microphone 102 may be properly processed by the audio recording system to remove any noise. The microphone 102 may receive the user's voice or any target sound in addition to noise, e.g., from other sources around the user or the target sound. The audio recording system may then account for the noise assuming that the tablet 101 is held or positioned in the proper orientation (upright position) and that the microphone 102 is located in the proper location accordingly (at the bottom edge). However, when the position/orientation of a tablet 101 is changed or rotated, e.g., by about 180 degrees as shown in FIG. 1 (b), the microphone 102 may not be located anymore in the proper location (e.g., with respect to the sound target) and hence the audio recording system (that assumes an upright positioning of the tablet 101) may not properly process the detected sound/voice and accompanying noise. As a result, the output of the audio recording system may not be optimized. For example, in a voice calling scenario, the communicated user voice may still include substantial noise or may not be clear to the receiver on the other side.

Similarly, the 3D video capturing system may be optimized according to a selected orientation of the tablet 101, such as the upright position of FIG. 1 (a), where the two cameras 104 may be positioned at the top edge of the tablet 101 (e.g., around the center of the top edge). In this case, the video or image captured by the cameras 104 may be properly processed by the 3D video capturing system to properly generate 3D like scenes. When the cameras 104 capture the image/video frames (e.g., of the user's face or any target scene), the 3D video capturing system may process the captured frames by accounting for the corresponding positioning of the cameras 104 (at the top edge), assuming that the tablet 101 is held or positioned in the proper orientation (upright position). However, when the position/orientation of a tablet 101 is changed or rotated, e.g., by about 180 degrees as shown in FIG. 1 (b), the cameras 104 may not be located anymore in the proper location (e.g., with respect to the target image/video), and hence the 3D video recording system (that assumes an upright positioning of the tablet 101) may not properly process the captured video/image. As a result, the output of the 3D video capturing system may not be optimized. For example, in a video conferencing scenario, the communicated user 3D video may not be clear to the viewer on the other side.

Figure 2:
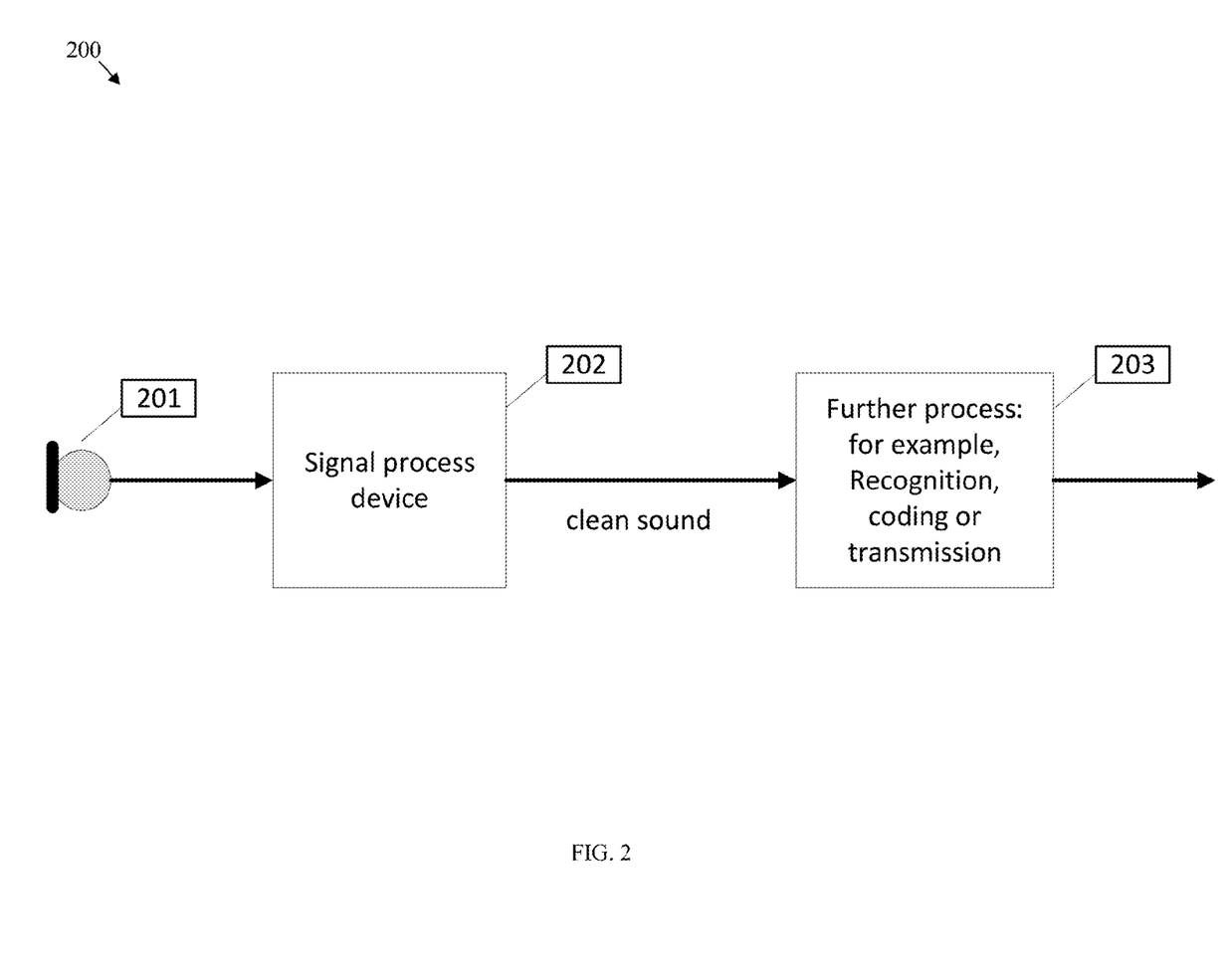
FIG. 2 is a schematic diagram of a sound recording system.

FIG. 2 illustrates an embodiment of a sound recording system 200, which may be used in the tablet 101 based on the tablet design 100. The sound recording system 200 may comprise a microphone 201, a signal processing device 202 coupled to the microphone 201, and at least one additional processing component 203 for further signal processing coupled to the signal processing device 202. The components of the sound recording system 200 may be arranged as shown in FIG. 2, and may be implement using hardware, software, or combinations of both. The microphone 201 may correspond to the microphone 102. The signal processing device 202 may be configured to receive the detected sound/audio from the microphone 201 as input, process the sound/audio, e.g., to cancel or suppress noise, and send a processed (clean) sound as output to the additional processing component(s) 203. The processes of the signal processing device 202 may include but are not limited to noise reduction and de-reverberation. The additional processing component(s) 203 may be configured to receive the clean sound as input, further process the clean sound, e.g., to implement sound recognition, encoding, and/or transmission, and accordingly provide digital sound data as output.

Figure 3:
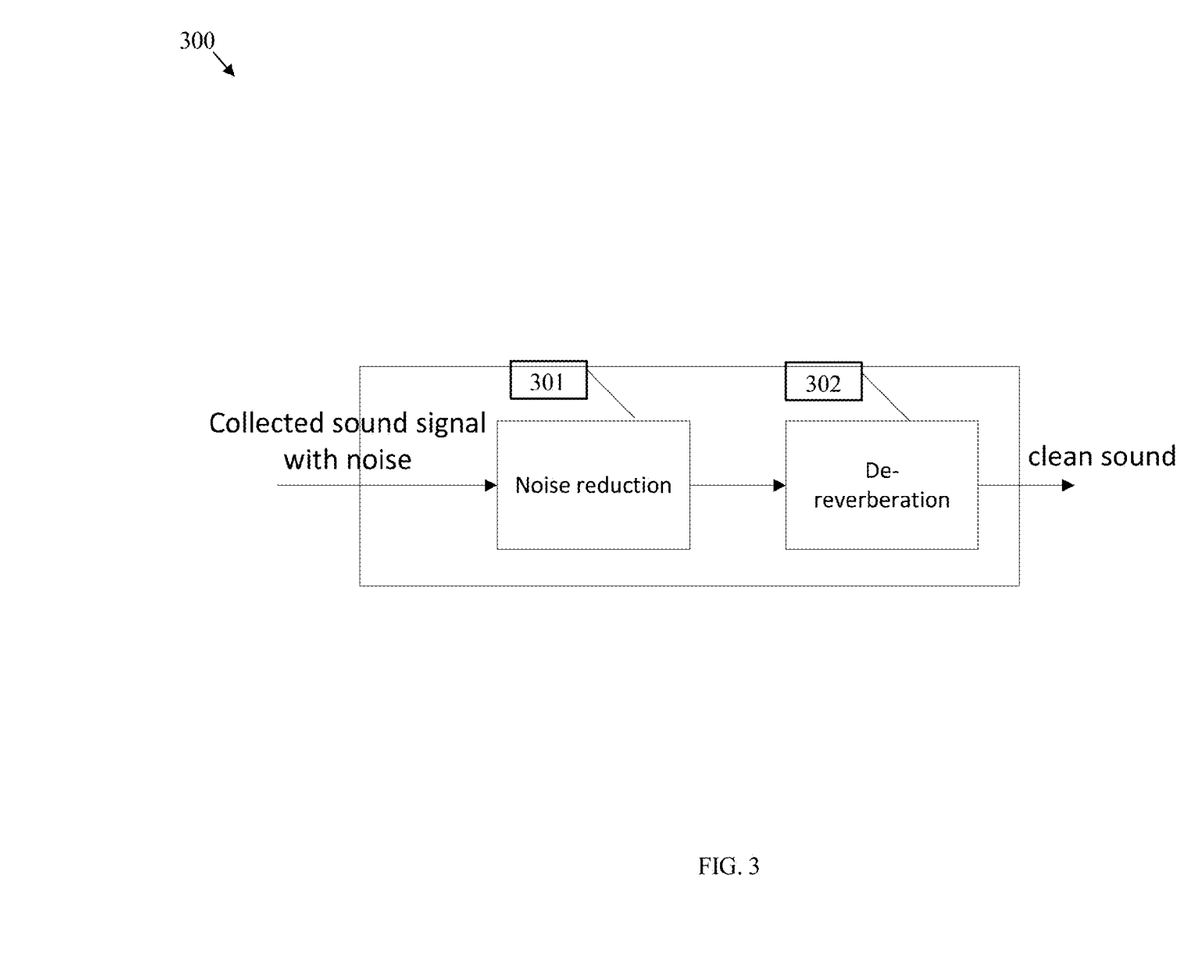
FIG. 3 is a schematic diagram of a signal processing component.

FIG. 3 illustrates an embodiment of a signal processing component 300, which may be used in the tablet 101 based on the tablet design 100. The signal processing component 300 may correspond to the signal processing component 202 of the sound recording system 200. The signal processing component 300 may comprise a noise reduction block 301 and a de-reverberation block 302 coupled to the noise reduction block 301. The components of the signal processing component 300 may be arranged as shown in FIG. 3, and may be implemented using hardware, software, or combinations of both. The noise reduction block 301 may be configured to receive the collected sound (e.g., from the microphone 201) signal possibly with noise and/or reverberation effect, process the sound signal to reduce or eliminate noise, and then forward processed signal to the de-reverberation block 302. The de-reverberation block 302 may be configured to receive the processed signal from the noise reduction block 301, further process the sound signal to cancel or reduce any reverberation effect in the sound, and then forward a clean sound as output.

Figure 4:
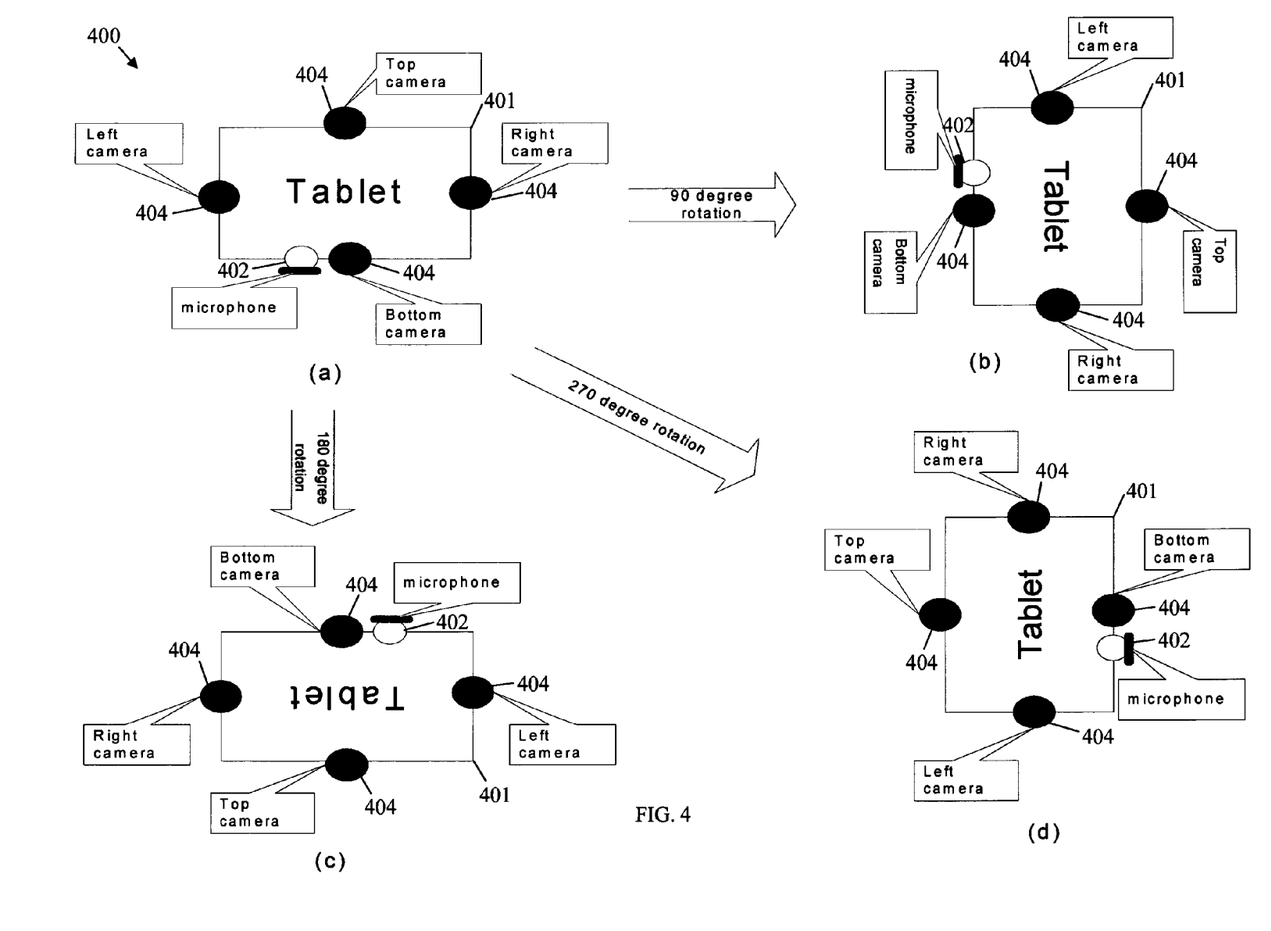
FIG. 4 is a schematic diagram of an embodiment of an improved tablet design.

FIG. 4 illustrates an embodiment of an improved tablet design 400 for a tablet 401. The tablet 401 may be any portable computation device characterized by a flat screen on one side of the tablet's housing. The components of the tablet 401 may be configured similar to the corresponding components of the tablet 101, including a screen that may be a touch screen. The tablet 401 may also comprise a microphone 402, e.g., on one edge of the tablet 401 around the screen. The microphone 402 may be a microphone array device, which may comprise a plurality of microphones arranged in an array configuration. The tablet 401 may also comprise at least two cameras 404, which may be 3D cameras for capturing 3D video/image(s). The cameras 404 may be positioned on one or different edges of the tablet 401. For instance, the tablet 401 may comprise about four cameras 404, which may be each located on one of the four edges of the tablet 401. Distributing the cameras 404 along different edges of the tablet 401 may allow considering different positioning/orientation of the tablet 400 when capturing video/images and hence better 3D video/image processing according to positioning/orientation. The components of the tablet 401 may be arranged as shown in FIG. 4 (a), which may correspond to one possible position (e.g., upright position) for holding and operating the tablet 401.

FIGS. 4 (b), (c), and (d) show other possible orientations for holding or operating the tablet 401, at 90 degrees, 180 degrees, and 270 degrees, respectively, from the orientation of FIG. 4 (a). At the different orientations, the positions of the microphone 402 and the cameras 404 from a fixed target, such as the user's face may be different. If typical sound/video processing schemes that assume a determined direction of the target with respect to one designated proper orientation of the tablet are used, then the outcome of processing the sound/video for a fixed target at different orientations of the tablet may lead to processing errors (degraded sound/video quality).

Instead, to allow holding and operating the tablet 401 at different orientations, the tablet 401 may comprise improved sound recording and/or 3D video capturing systems (not shown). The improved sound recording/3D video capturing systems may process the sound/video appropriately at any orientation or positioning (tilting) of the tablet 401 based on position/orientation information of the tablet 401 while recording sound and/or capturing 3D video. The tablet 401 may comprise an orientation detection device (not shown) that is configured to detect the position information. The position information may be used by a sound recoding system to estimate DOA for the signal and process accordingly the sound recorded by the microphone 402. For example, the sound detected by only some of the microphones in the array selected based on the position information may be considered. Similarly, the position information may be used by a 3D video capturing system to filter and process the video/image captured by the cameras 404. For example, the video/image captured by only some of the cameras 404 selected based on the position information may be considered.

The orientation detection device may be configured to generate orientation information, position data, and/or angle data that may be used by a microphone adjusting device (not shown) and/or a video configuration device (not shown). The microphone adjusting device may be configured to select the microphones or steer the sensors in the microphone for sound processing consideration in the array based on the orientation information and may be part of the sound recording system. The video configuration device may be configured to select or arrange the cameras 404 (e.g., direct the sensors in the cameras) for video processing consideration based on the orientation information and may be part of the 3D video capturing system.

For example, when the tablet is rotated relative to the horizontal plane, a position detector in the orientation detection device may detect the relative position or tilt of the tablet 401 to the ground and generate the position information data accordingly. The position information data may be used in the microphone adjustment device. For instance, the microphone adjustment device may steer accordingly a maximum sensitivity angle of the microphone array, e.g., with respect to the face or mouth of the user and/or may pass this information to a signal processing device (not shown) to conduct the signal processing process on the collected sound signals by the microphone array. The signal processing device may be part of the sound recording system. The signal processing process may include noise reduction, de-reverberation, speech enhancement, and/or other sound enhancement processes. The position information data may also be used in a 3D video configuration device/system to conduct and configure at least a pair of cameras 404 for capturing 3D videos and images.

Figure 5:
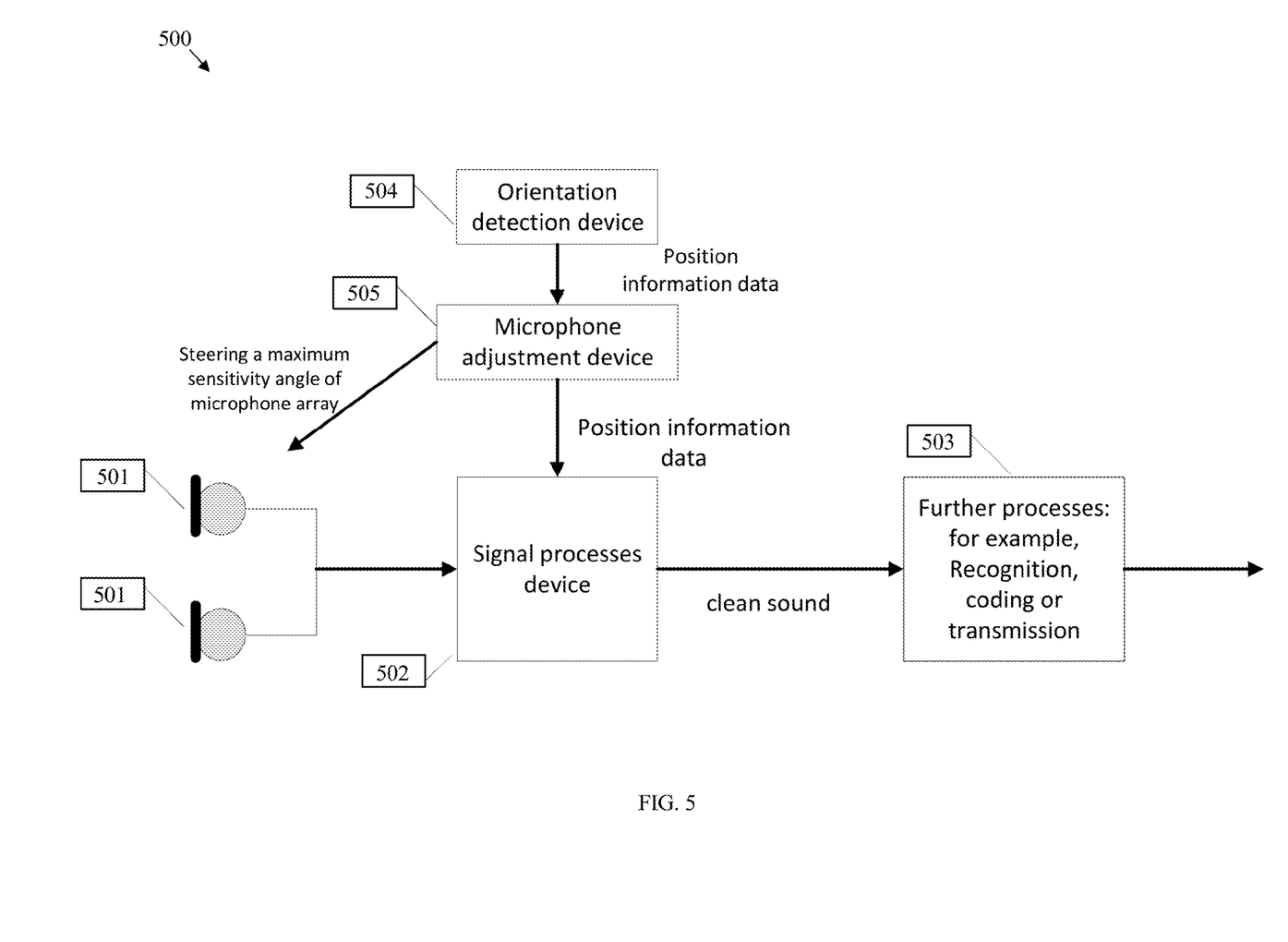
FIG. 5 is a schematic diagram of an embodiment of an improved sound recording system.

FIG. 5 illustrates an embodiment of an improved sound recording system 500, which may be used in the tablet 401 based on the tablet design 400. The sound recording system 500 may comprise at least two microphones 501, a signal processing device 502 coupled to the microphones 501, and at least one additional processing component(s) 503 for further signal processing coupled to the signal processing device 502. Additionally, the sound recording system 500 may comprise a microphone adjustment device 505 coupled to the signal processing device 502, and an orientation detection device 504 coupled to the microphone adjustment device 505. The components of the sound recording system 500 may be arranged as shown in FIG. 5, and may be implement using hardware, software, or combinations of both.

The microphones 501 may be two separate omni-directional microphones, two separate microphone arrays, or two microphones (sensors) in a microphone array. In other embodiments, the sound recording system 500 may comprise more than two separate microphones 501, e.g., on one or different edges of the tablet. The input to the signal processing device 502 may comprise collected sound signals from each of the microphones 501 and position information data from the microphone adjustment device 505. The orientation detection device 504 may comprise an accelerometer and/or orientation/rotation detection device configured to provide orientation/rotation information. The orientation/rotation information may be detected with respect to a designated position or orientation of the tablet, such as with respect to the horizontal plane. Additionally or alternatively, the orientation detection device 504 may comprise face/mouth recognition devices that may be used to estimate position/orientation information of the tablet with respect to the user.

The position information data from the orientation detection device 504 may be sent to the microphone adjustment device 505, which may be configured to steer a maximum sensitivity angle of the microphones 501 (or microphone arrays). The microphones 501 may be steered so that the mouth of the user is aligned within the maximum sensitivity angle, and thus better align detection with the direction of incoming sound signal and away from noise sources. Alternatively or additionally, the microphone adjustment device 505 may send the position information data to the signal processing device 502. The signal processing device 502 may implement noise reduction/de-reverberation processes using the position information data to obtain clean sound. Additionally, the signal processing device 502 may implement DOA estimation for sound, as described further below. The clean sound may then be sent to the additional processing component(s) 503, which may be configured to implement signal recognition, encoding, and/or transmission.

Figure 6:
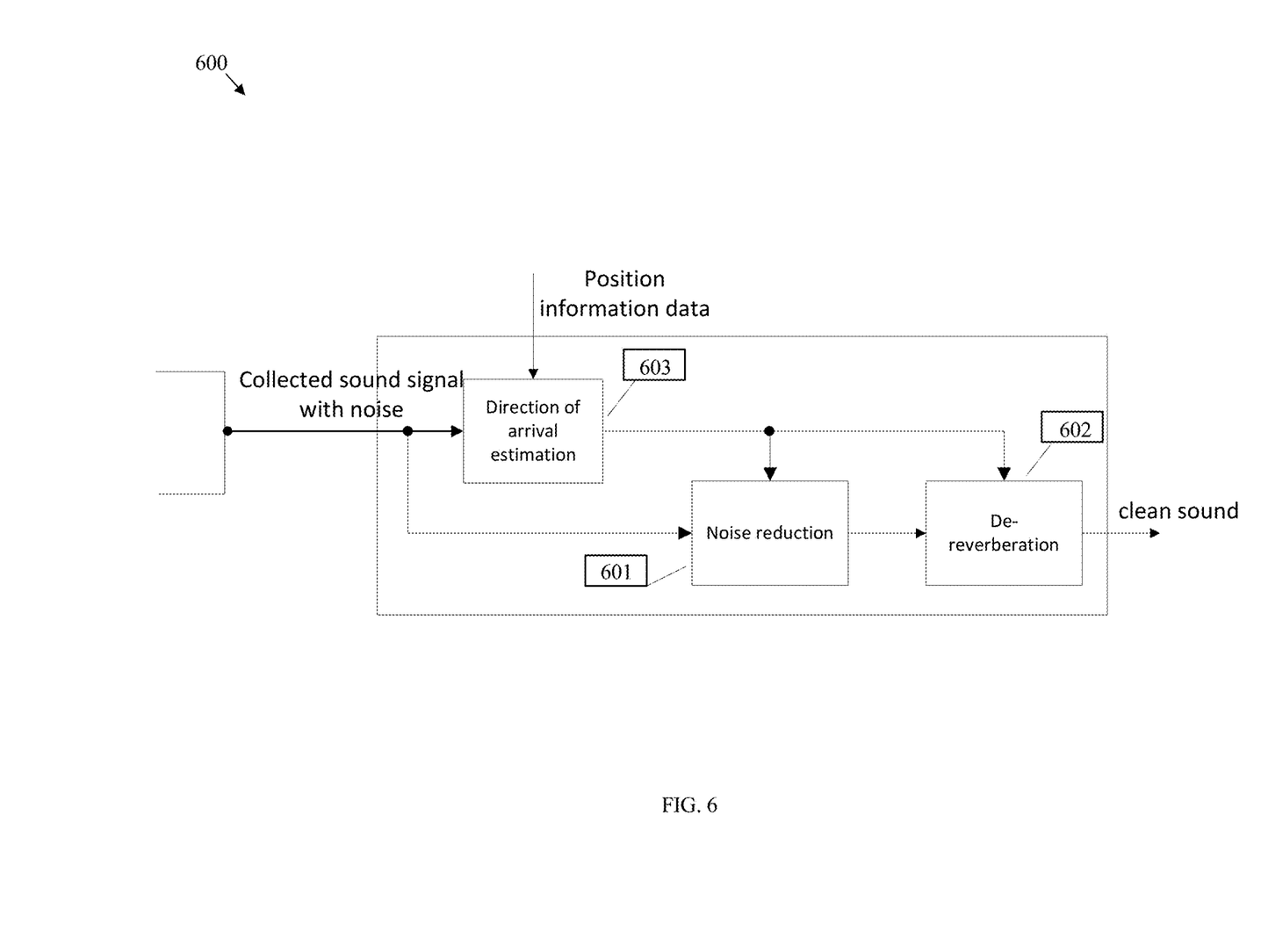
FIG. 6 is a schematic diagram of an embodiment of an improved signal processing component.

FIG. 6 illustrates an embodiment of an improved signal processing component 600, which may be used in the tablet 401 based on the tablet design 400. The signal processing component 600 may correspond to the signal processing device 502 of the sound recording system 500. The signal processing component 600 may comprise a noise reduction block 601, a de-reverberation block 602 coupled to the noise reduction block 601, and a DOA estimation block 603 coupled to both the noise reduction block 601 and the de-reverberation block 602. The components of the signal processing component 600 may be arranged as shown in FIG. 6, and may be implement using hardware, software, or combinations of both.

The DOA estimation block 603 may be configured to receive the collected sound possibly with noise from each microphone (e.g., microphones 501) and implement DOA based on received position information (e.g., from the orientation detection device 504 and/or the microphone adjustment device 505). The position information data may be used by the DOA estimation block 603 to estimate a DOA for the incoming sound signal. The DOA estimation may be achieved using DOA estimation algorithms, such as the MUSIC algorithm. The output of the DOA estimation block 603 (DOA estimation information) may be sent as input to each of the noise reduction block 601 and the de-reverberation block 602 to achieve improved noise reduction and de-reverberation, respectively, based on the DOA information. The collected signal from each of the microphones may also be sent to the noise reduction block 601, where the noise reduction process may be performed using the DOA information. The noise reduction block 601 may forward the processed signal to the de-reverberation block 602, which may further process the sound signal to cancel or reduce any reverberation effect in the sound using the DOA information, and then forward a clean sound as output.

Figure 7:
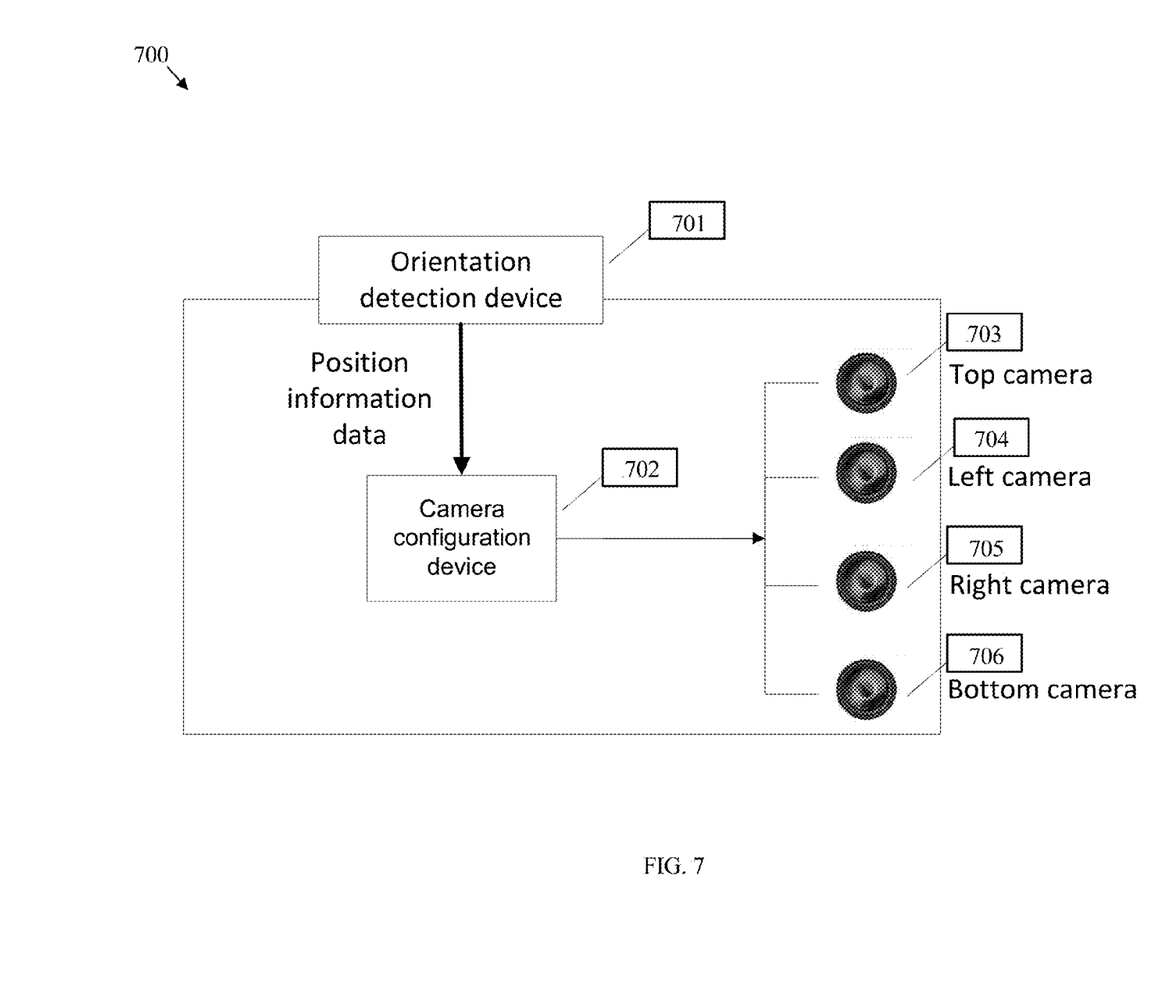
FIG. 7 is a schematic diagram of an embodiment of an improved 3D video capturing system.

FIG. 7 illustrates an embodiment of a 3D video capturing system 700, which may be used in the tablet 401 based on the tablet design 400. The 3D video capturing system 700 may comprise an orientation detection device 701, a camera configuration device 702 coupled to the orientation detection device 701, and a plurality of cameras 703-706 coupled to the camera configuration device 702. The cameras 703-706 may be, for example, 3D cameras that correspond to the cameras 404 The orientation detection device 704 may be configured to provide orientation/rotation information, e.g., similar to the orientation detection device 504. For instance, the orientation detection device 704 may comprise an accelerometer, other orientation/rotation detection device, a face/mouth recognition device, or combinations thereof, which may be used to estimate position/orientation information of the tablet with respect to the user.

The orientation detection device 701 may send the estimated position information data to the camera configuration device 702, which may be configured to select a correct or appropriate pair of cameras from the cameras 703-706, e.g., according to the position information. The cameras may be selected with the assumption that the user is sitting in front of the camera, which may be the typical scenario or most general case for tablet users. For example, if the tablet is rotated at about 90 degrees (as shown in FIG. 4 (*d*)) with respect to the user's face, the correct pair of selected cameras may be the cameras on the top and bottom edges (in the initial (upright) position of FIG. 4 (*a*)).

Figure 8:
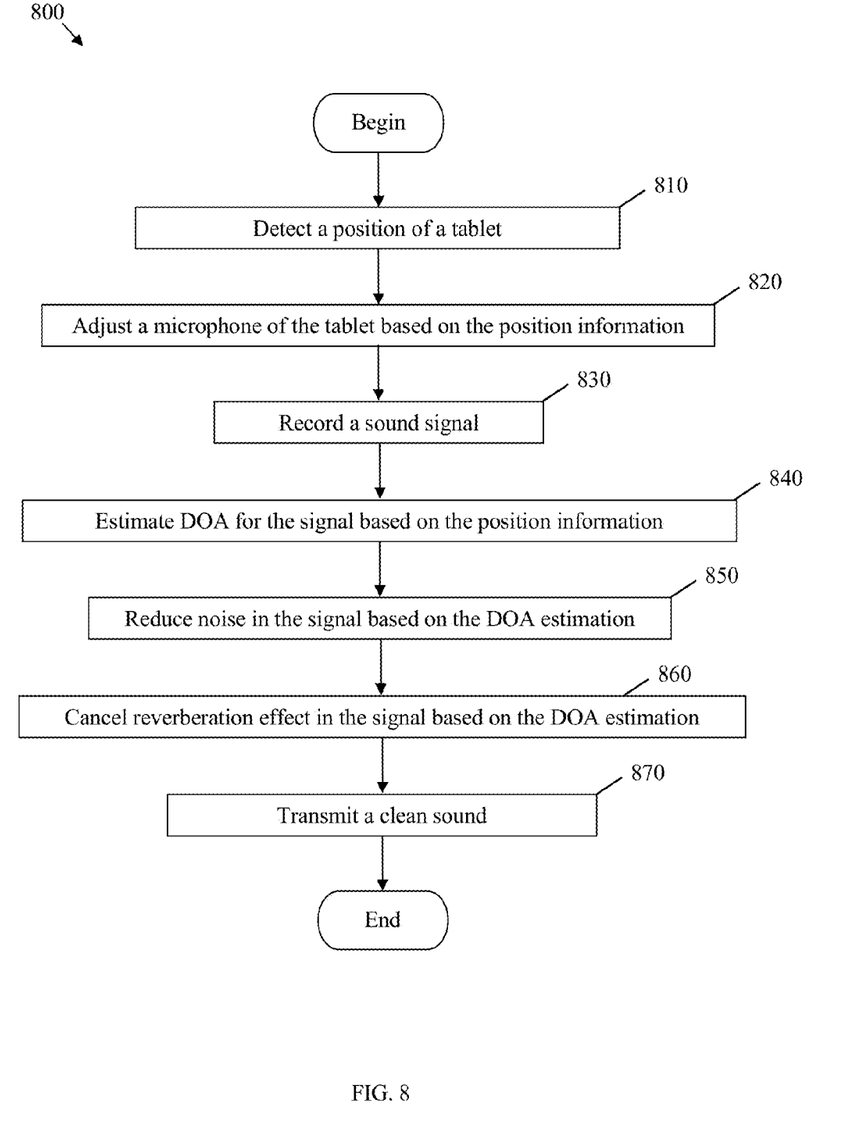
FIG. 8 is a flowchart of an embodiment of an improved sound recording method.

FIG. 8 illustrates a flowchart of an embodiment of a sound recording method 800, which may be implemented in the tablet 401. For instance, the sound recording method 800 may be implemented using the sound recording system 500. The method 800 may begin at block 810, where a position of the tablet may be detected. The position/orientation may be detected by the orientation detection device 504. At block 820, a microphone of the tablet may be adjusted based on the position information. For instance, the microphone adjustment device 505 may steer a maximum sensitivity angle of the microphones 501 (or microphone arrays). At block 830, a sound signal may be recorded, e.g., by at least two microphones 501. At block 840, a DOA may be estimated for the signal based on the position information. For instance, the DOA estimation block 603 may implement an algorithm to obtain the DOA based on the position information. At block 850, the noise in the signal may be reduced based on the DOA estimation. The DOA estimation may be used by the noise reduction block 601 to reduce or eliminate the noise in the signal. At block 860, a reverberation effect in the signal may be canceled based on the DOA estimation. For instance, the de-reverberation block 602 may use the DOA estimation to remove the reverberation effect in the signal. At block 870, a clean sound may be transmitted. The clean sound may result from removing noise, reverberation effect, and/or other errors in the detected sound signal. The method 800 may then end.

Figure 9:
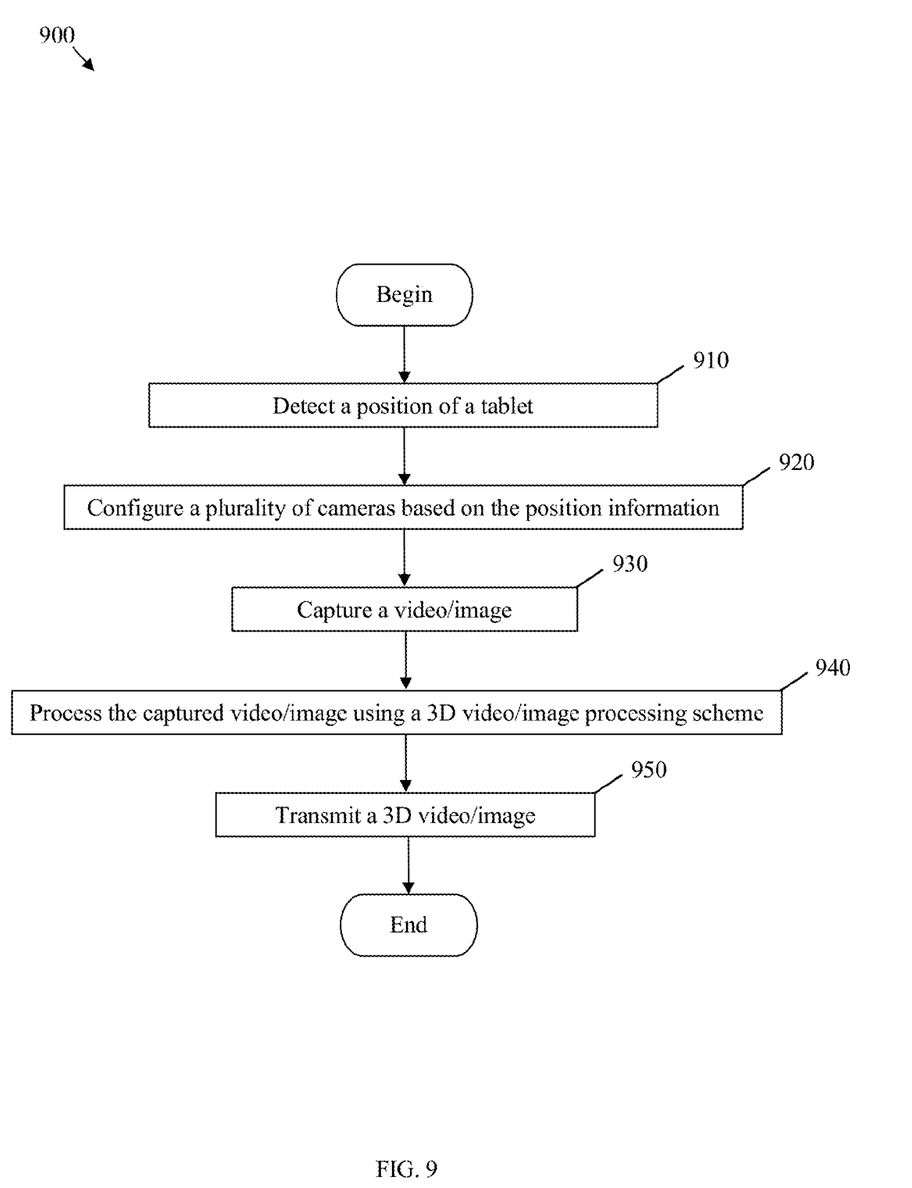
FIG. 9 is a flowchart of an embodiment of an improved 3D video capturing method.

FIG. 9 illustrates an embodiment of a 3D video capturing method 900, which may be implemented in the tablet 401. For instance, the 3D video capturing method 900 may be implemented using the 3D video capturing system 700. The method 900 may begin at block 910, where a position of the tablet may be detected. The position/orientation may be detected by the orientation detection device 701. At block 920, a plurality of cameras may be configured based on the position information. For instance, the camera configuration device 702 may select an appropriate pair of cameras from the cameras 703-706 according to the position information. At block 930, a video/image may be captured, e.g., by the selected cameras. At block 940, the captured video/image may be processed using a 3D video/image processing scheme. At block 950, a 3D video/image may be transmitted. The method 900 may then end.

Figure 10:
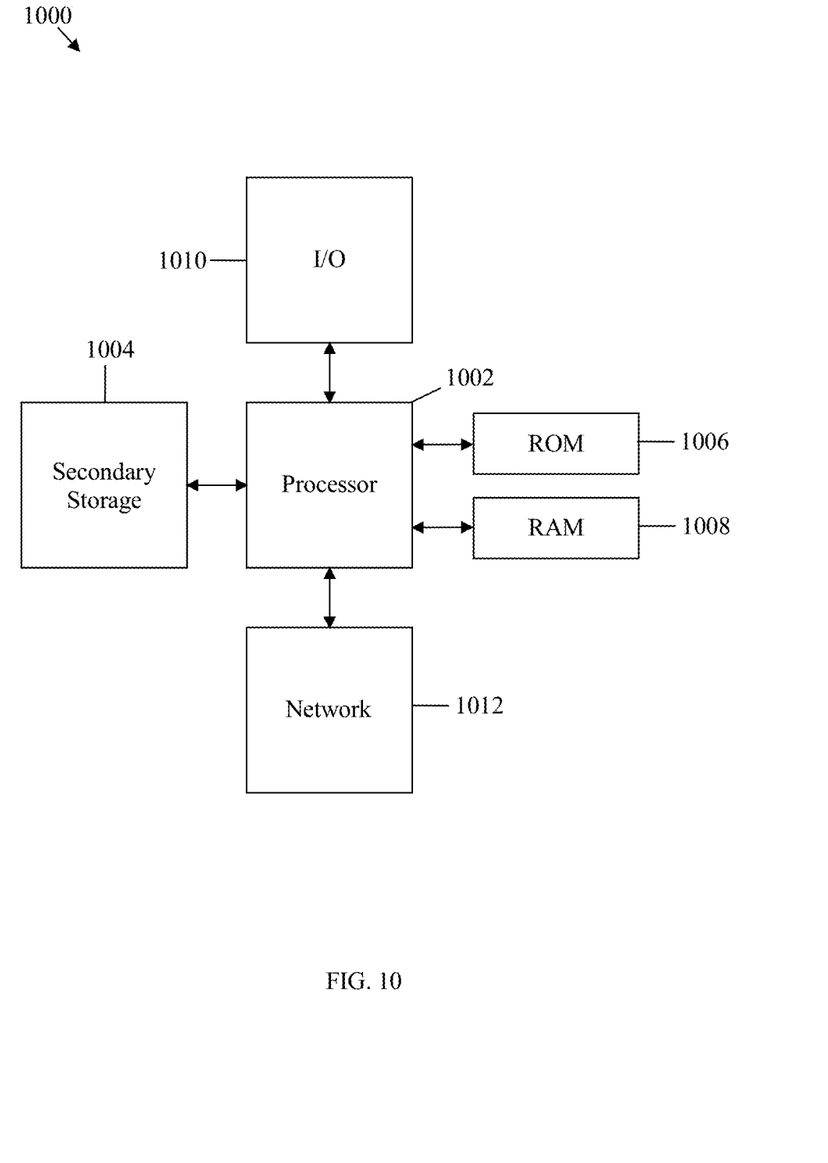
FIG. 10 is a schematic diagram of an embodiment of a general-purpose computer system.

In some embodiments, the components described above may be implemented on any general-purpose computer system or smart device component with sufficient processing power, memory resources, and throughput capability to handle the necessary workload placed upon it. FIG. 10 illustrates a typical, general-purpose computer system 1000 suitable for implementing one or more embodiments of the components disclosed herein. The computer system 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs).

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computation system comprising:
   an orientation detection device configured to detect an orientation of the computation system as orientation information, wherein the orientation detection device comprises an accelerometer that indicates a rotational orientation or a tilt orientation relative to a horizontal plane;
   a multi-sensor system coupled to the orientation detection device, wherein the multi-sensor system is configured to capture a three-dimensional (3D) image, wherein the multi-sensor system comprises a 3D image capturing system, wherein the 3D image capturing system comprises a camera group comprising a plurality of pairs of cameras on a same side of the computation system such that any camera pair is selectable to obtain 3D images, and wherein the 3D image capturing system is configured to:
      determine the orientation of the computation system based on output of the orientation detection device; and
      select a camera pair from the camera group to obtain the 3D image based on the determined orientation of the computation system; and
   at least one signal processing component coupled to the orientation detection device and to the multi-sensor system, wherein the at least one signal processing component is configured to modify the captured 3D image based on the orientation information.

2. The computation system of claim 1, wherein the at least one signal processing component is configured to modify the 3D image based on the orientation information.

3. The computation system of claim 1, wherein each of the pairs of cameras are located proximate to different edges of the computation system.

4. The computation system of claim 1, wherein the 3D image capturing system is part of a tablet system, and wherein the tablet system is configured to enable at least one of video conferencing, voice calling, and a human computer interface.

5. A three-dimensional (3D) video capturing system comprising:
   a camera group comprising a plurality of cameras pairs on a same side of the 3D video capturing system such that any camera pair is selectable to capture a 3D image or a 3D video;
   an orientation detection device, wherein the orientation detection device comprises an accelerometer configured to detect an orientation of the 3D video capturing system as orientation information, wherein the orientation information comprises at least one of a rotational orientation or a tilt orientation with respect to a horizontal plane; and
   a camera configuration device coupled to the orientation detection device and the camera group, wherein the camera configuration device is configured to:
      determine the orientation of the 3D video capturing system based on the orientation information detected by the orientation detection device; and
      select a camera pair from the camera group to capture the 3D video or the 3D image based on the determined orientation of the 3D video capturing system.

6. The 3D video capturing system of claim 5, wherein the orientation information comprises a position of the 3D video capturing system with respect to a user.

7. The 3D video capturing system of claim 5, wherein the selected camera pair comprise two cameras located proximate to opposite edges of a tablet device.

8. A three-dimensional (3D) video capturing method implemented on a portable device, comprising:
   detecting an orientation of the portable device using an accelerometer that indicates a rotational orientation or a tilt orientation relative to a horizontal plane;
   selecting a camera pair from a camera group comprising a plurality of pairs of cameras on a same side of the portable device such that each camera pair is selectable to obtain a 3D image or a 3D video, wherein the camera pair is selected from the camera group based on the orientation of the portable device; and
   capturing the 3D video or the 3D image using the selected camera pair.

9. The 3D video capturing method of claim 8, further comprising:
   processing the captured image using a 3D image processing scheme; and
   transmitting the 3D image.

10. The 3D video capturing method of claim 8, wherein selecting the camera pair comprises filtering out data from one or more pairs of cameras that are not selected to obtain the 3D image or the 3D video.

11. The computation system of claim 1, wherein the 3D image capturing system is configured to filter out data from one or more pairs of cameras that are not selected to obtain the 3D image.

12. The 3D video capturing system of claim 5, wherein the camera configuration device is configured to filter out captured data from one or more pairs of cameras that are not selected to capture the 3D video or the 3D image.

13. A method comprising:
   detecting an orientation of a portable device via an accelerometer that indicates a rotational orientation or a tilt orientation of the portable device relative to a horizontal plane, wherein the portable device comprises a camera group comprising a plurality of pairs of cameras such that each camera pair is selectable to obtain a three-dimensional (3D) image or a 3D video; and
   selecting, by a processor of the portable device, a camera pair from the camera group to obtain the 3D image or the 3D video based on the detected orientation of the portable device.

14. The method of claim 13, further comprising capturing the 3D image or the 3D video with the camera pair selected based on the detected orientation of the portable device.

15. The method of claim 14, further comprising employing a signal processing component to modify the captured 3D image or the 3D video based on the detected orientation of the portable device.

16. A portable device comprising:
a camera group comprising a plurality of cameras pairs such that each camera pair is selectable to capture a three-dimensional (3D) image or a 3D video;
an accelerometer configured to indicate an orientation of the portable device based on a rotational orientation or a tilt orientation with respect to a horizontal plane; and
a processor coupled to the camera group and the accelerometer and configured to:
determine the orientation of the portable device based on the indication from the accelerometer; and
select a camera pair from the camera group to obtain the 3D image or the 3D video based on the determined orientation of the portable device.

17. The portable device of claim 16, wherein the processor is further configured to cause the pair of cameras selected based on the determined orientation of the portable device to capture the 3D image or the 3D video.

18. The portable device of claim 17, further comprising a signal processing component coupled to the processor and configured to modify the captured 3D image or the 3D video based on the determined orientation of the portable device.

19. The portable device of claim 16, wherein each of the pairs of cameras of the camera group are located proximate to different edges of the portable device.

\* \* \* \* \*

UNITED STATES PATENT AND TRADEMARK OFFICE
CERTIFICATE OF CORRECTION

PATENT NO. : 9,246,543 B2
APPLICATION NO. : 13/323157
DATED : January 26, 2016
INVENTOR(S) : Jiong Zhou and Ton Kalker

Page 1 of 1

It is certified that error appears in the above-identified patent and that said Letters Patent is hereby corrected as shown below:

Title page item (75), Inventors should read:

Inventors: Jiong Zhou, Santa Clara, CA (US)

Signed and Sealed this
Twelfth Day of April, 2016

Michelle K. Lee
*Director of the United States Patent and Trademark Office*